(12) United States Patent
Long et al.

(10) Patent No.: US 7,128,084 B2
(45) Date of Patent: Oct. 31, 2006

(54) SELF-CLEANING VALVE ASSEMBLY

(75) Inventors: Charles F. Long, Pittsboro, IN (US); Phillip F. Mc Cauley, Zionsville, IN (US); Scott E. Mundy, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 57 days.

(21) Appl. No.: 11/018,621

(22) Filed: Dec. 21, 2004

(65) Prior Publication Data

US 2006/0131528 A1 Jun. 22, 2006

(51) Int. Cl.
*F16K 3/36* (2006.01)
*F16K 5/22* (2006.01)
*F16K 11/00* (2006.01)
*F16K 51/00* (2006.01)

(52) U.S. Cl. .................... 137/238; 251/129.08
(58) Field of Classification Search ........... 251/129.08; 137/237, 238
See application file for complete search history.

(56) References Cited

U.S. PATENT DOCUMENTS 5,971,889 A * 10/1999 Ohashi et al. ............... 477/149
6,170,506 B1 * 1/2001 Butwin et al. ................. 137/2
6,718,921 B1 * 4/2004 Grewal et al. ........... 123/90.15

* cited by examiner

*Primary Examiner*—Edward K. Look
*Assistant Examiner*—John K. Fristoe, Jr.
(74) *Attorney, Agent, or Firm*—Christopher DeVries

(57) ABSTRACT

The present invention provides a method and apparatus for a self-cleaning valve assembly. The valve is adapted to cycle and thereby clean the valve assembly in response to one or more predefined parameters which are programmed into a programmable controller. The valve is additionally configured to cycle according to one or more of several different methods which have been shown to efficiently clean the valve assembly. In this manner, the valve assembly is automatically cleaned improving the efficiency thereof and eliminating stuck valve warranty returns.

14 Claims, 3 Drawing Sheets

SELF-CLEANING VALVE ASSEMBLY

TECHNICAL FIELD

This invention relates to a self-cleaning valve assembly.

BACKGROUND OF THE INVENTION

Since debris can build up in a valve assembly over time and thereby increase valve friction, it is desirable to provide a self-cleaning valve assembly. In a preferred embodiment, the self-cleaning valve assembly of the present invention is implemented in a transmission; however, it should be appreciated that the self-cleaning valve assembly may be used with any number of other devices as well.

The industry standard for valve bore clearances on transmission control systems is 0.0008" to 0.0023" diametrical clearance. This allows for 0.0005" total tolerance on the valve diameter and 0.001" total tolerance on the valve bore. These tolerances are well established and it is difficult to reduce the tolerance further without much more expensive part processing. It has been observed that if the filtration system does not filter out debris greater than 0.0008", there is the potential for debris to cause valve sticking. Typically, automotive filters trap debris at sizes above 0.0024". While higher filtration levels can provide better protection, such filters plug too quickly to be practical.

Valves are particularly sensitive to debris that is about the same size as the valve clearance. Single particles can be wedged between valve and valve body, solidly sticking the valve. Another situation can occur where particles smaller than the diametral clearance can accumulate between the valve and the valve body and gradually increase friction to the point that valve stroke times are delayed or the valve momentarily sticks. Large buildups can cause friction to overcome the return spring force causing the valve to stick in a stroked position.

SUMMARY OF THE INVENTION

The present invention relates to a method and apparatus for a self-cleaning valve. More precisely, the valve is configured to automatically cycle for the purpose of clearing any debris in response to a predefined parameter or trigger, irrespective of the normal actuation of the valve for a desired system operation.

According to a preferred embodiment the valve is completely de-stroked and stroked multiple times to clear the valve assembly of any debris. Alternatively, the valve may be shaken by a high frequency dither, partially de-stroked several times, partially stroked several times, etc.

According to another preferred embodiment, the frequency and duration of valve cleaning is based on a vehicle mileage parameter. Alternatively, the frequency and duration of valve cleaning may be based any number of other parameters such as time in range, shift density, the time required to stroke the valve, etc.

It has been observed that cycling the valve according to the methods described herein efficiently clears valve debris, however, it should be appreciated that any method wherein the valve is cycled may be implemented for this purpose.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
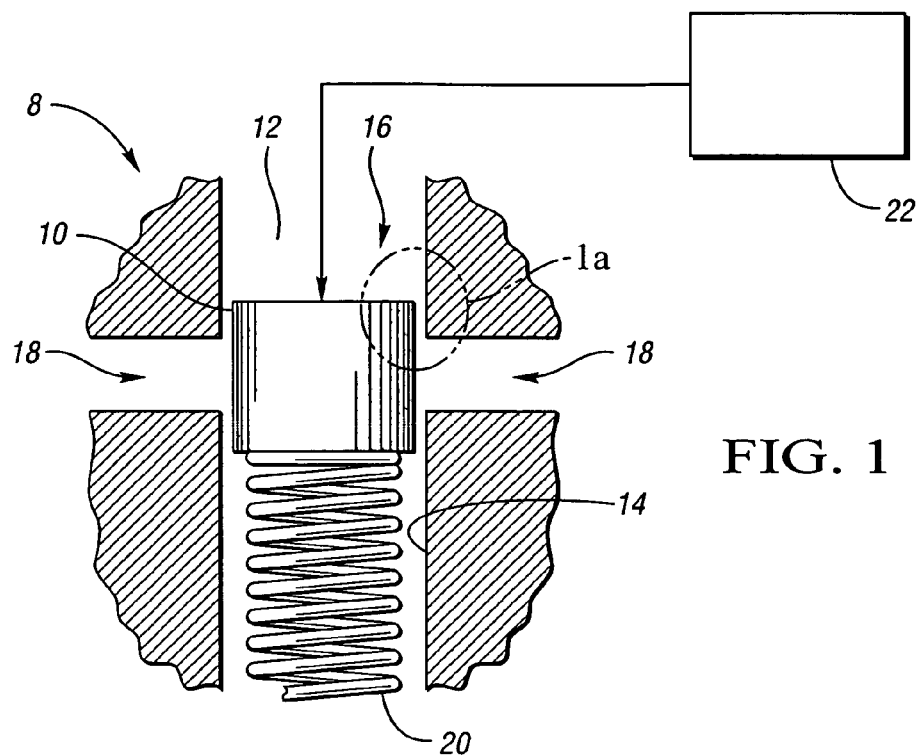
FIG. 1 shows a schematic cross-sectional view of a self-cleaning valve assembly having a valve disposed within a bore of a valve body according to the present invention.

Referring to the drawings wherein like reference numbers refer to like components, FIG. 1 shows a self-cleaning valve assembly 8 having a valve 10 disposed within a bore 12 of a valve body 14. The valve body 14 further defines one or more pressure ports 16 and one or more outlet ports 18. A return spring 20 engages the valve 10 within the bore 12. As pressure is introduced into the pressure port 16 the valve 10 is displaced thereby compressing the return spring 20 to open the outlet ports 18. The valve assembly 8 is preferably electronically controlled by a programmable controller 22 adapted to regulate fluid flow into the pressure port 16 and thereby actuate the valve 10. The programmable controller 22 is further adapted to generate a triggering signal or profile that controls the frequency and duration of valve assembly cleaning.

Figures 1A, 1B:
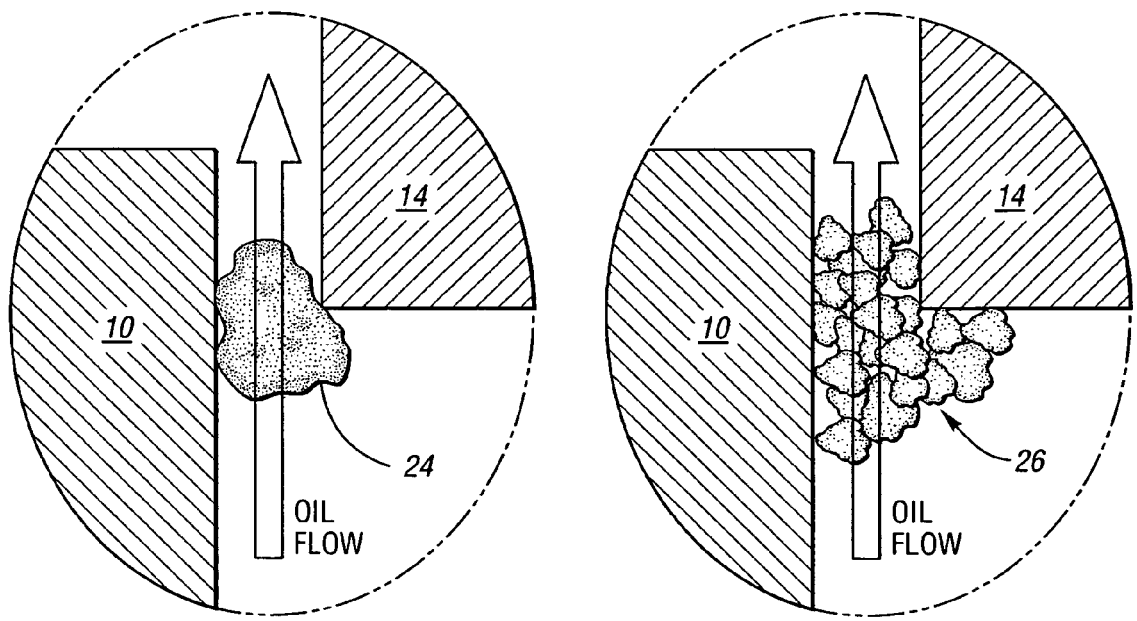
FIG. 1a shows a schematic cross-sectional view of a single large particle disposed between the valve and valve body of FIG. 1.
FIG. 1b shows a schematic cross-sectional view of a plurality of smaller particles disposed between the valve and valve body of FIG. 1.

As best seen in FIG. 1a, a single large particle 24 may become wedged between the valve 10 and the body 14. Alternatively, as shown in FIG. 1b, a plurality of smaller particles 26 may become trapped between the valve 10 and the body 14. A build-up of debris composed of particles 24 and/or 26 increases valve friction thereby reducing the efficiency of valve assembly 8. The self-cleaning valve assembly 8 is therefore adapted to automatically clear such debris to maintain optimal valve performance as described in detail hereinafter.

In a preferred embodiment, the self-cleaning valve assembly 8 is implemented in a transmission system, however, it should be appreciated that the self-cleaning valve may be used with any number of other systems as well. FIGS. 2–5 which are described in detail hereinafter show several preferred methods for cycling and thereby cleaning the valve assembly; however, it should be appreciated that any method wherein the valve is cycled may be implemented for this purpose.

Figure 2:
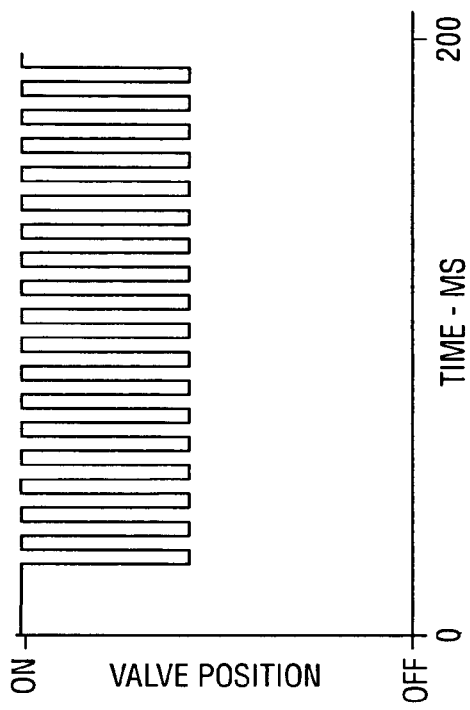
FIG. 2 is a graph depicting a method of the present invention wherein the valve is completely de-stroked and stroked multiple times.

FIG. 2 shows a method of the present invention wherein the valve 10 is completely de-stroked and stroked multiple times to clean the valve assembly 8. More precisely, FIG. 2 is a graph of valve position versus time as the valve 10 is completely de-stroked from the on position to the off position, and thereafter completely stroked from the off position to the on position. The speed and duration of the method of FIG. 2 are pre-defined according to the needs of a particular application and may be programmed into the programmable controller 22.

Figure 3:
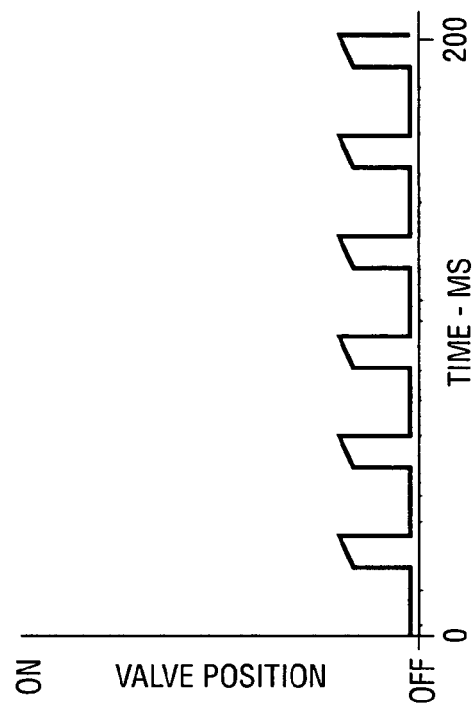
FIG. 3 is a graph depicting a method of the present invention wherein the self-cleaning valve assembly of FIG. 1 is shaken by a high frequency dither.

FIG. 3 shows a method of the present invention wherein the valve 10 is shaken by a high frequency dither that has a duration long enough to physically move the valve assembly 8 a slight amount. More precisely, FIG. 3 is a graph of valve position versus time as the valve 10 is rapidly cycled back and forth between the on position and an intermediate valve position. The frequency of the signal is preferably based on the natural frequency of the valve.

Figure 4:
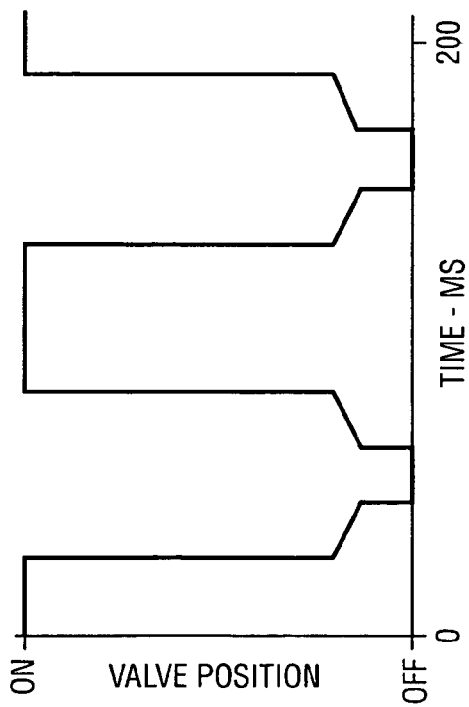
FIG. 4 is a graph depicting a method of the present invention wherein the valve is partially de-stroked several times.

FIG. 4 shows a method of the present invention wherein the valve is partially de-stroked several times. More precisely, FIG. 4 is a graph of valve position versus time as the valve 10 is cycled back and forth between the on position and an intermediate valve position. The speed and duration of the method of FIG. 4 are pre-defined according to the needs of a particular application and may be programmed into the programmable controller 22.

Figure 5:
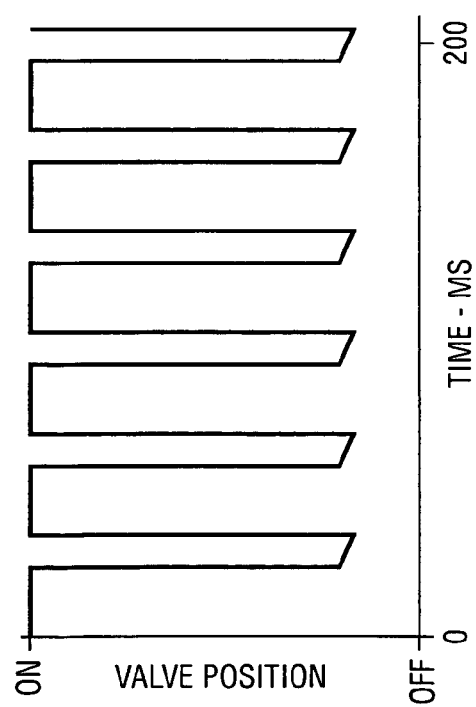
FIG. 5 is a graph depicting a method of the present invention wherein the valve is partially stroked several times.

FIG. 5 shows a method of the present invention wherein the valve is partially stroked several times. More precisely, FIG. 5 is a graph of valve position versus time as the valve 10 is cycled back and forth between the off position and an intermediate valve position. The speed and duration of the method of FIG. 5 are pre-defined according to the needs of a particular application and may be programmed into the programmable controller 22.

The frequency and duration of the valve cleaning described herein are preferably programmed into the programmable controller 22 as a function of one or more different parameters or triggers. As an example such parameters may include vehicle mileage, time in range, shift density, throttle, speed changes, oil temperature, oil age, etc. FIGS. 6–9 show several preferred parameters adapted to control frequency and duration of valve cleaning; however, it should be appreciated that any number of alternate parameters may be implemented for such a purpose.

Figure 6:
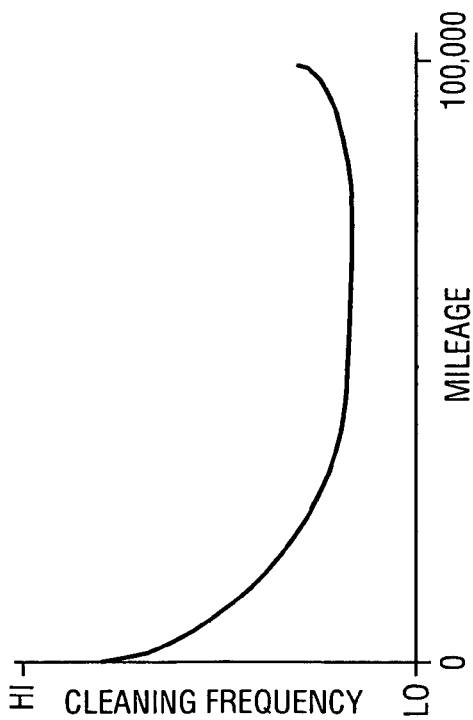
FIG. 6 is a graph depicting a method of the present invention wherein the cleaning frequency of the self-cleaning valve assembly of FIG. 1 is based on a vehicle mileage parameter.

FIG. 6 shows a cleaning frequency based on a vehicle mileage parameter. More precisely, FIG. 6 is a graph of cleaning frequency versus vehicle mileage wherein the valve assembly 8 is cleaned less frequently as vehicle mileage increases. The embodiment shown in FIG. 6 was developed in response to the observation that the majority of sticking valve issues occur in the first 5,000 miles when the transmission is going through a clutch break in period (oil suspended friction element material is present in higher concentrations during the break in period).

Figure 7:
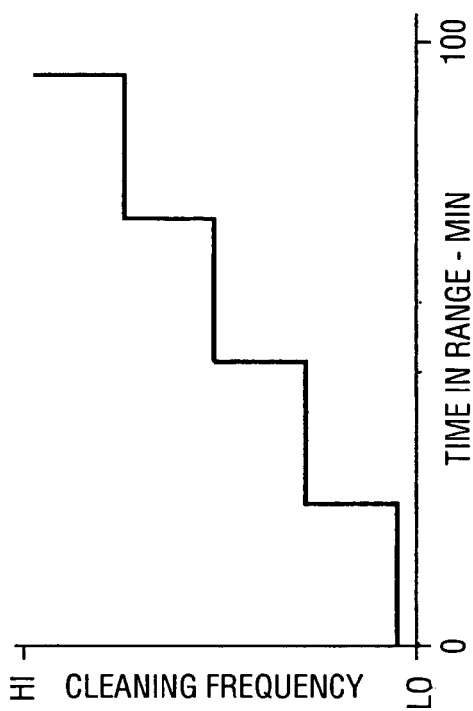
FIG. 7 is a graph depicting a method of the present invention wherein the cleaning frequency of the self-cleaning valve assembly of FIG. 1 is based on a time in range parameter.

FIG. 7 shows a cleaning frequency based on a time in range parameter. More precisely, FIG. 7 is a graph of cleaning frequency versus time in range wherein the valve assembly 8 is cleaned more frequently if the valve 10 remains in a predefined valve position range for a longer period of time. The embodiment shown in FIG. 7 was developed in response to the observation that valves are more likely to stick if they remain in a single position for a long period of time. The time in range parameter is particularly well adapted to clear the valve assembly 8 of the buildup of a plurality of fine particles such as the particles 26 shown in FIG. 1b.

Figure 8:
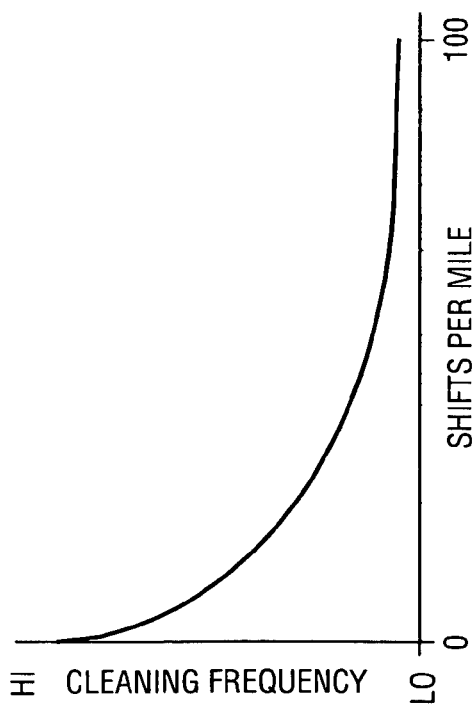
FIG. 8 is a graph depicting a method of the present invention wherein the cleaning frequency of the self-cleaning valve assembly of FIG. 1 is based on a shift density parameter.

FIG. 8 shows a cleaning frequency based on a shift density parameter. More precisely, FIG. 8 is a graph of cleaning frequency versus shifts per mile wherein the valve assembly 8 is cleaned less frequently as the number of shifts per mile increases. The shift density parameter is particularly well adapted to clear the valve assembly 8 of the buildup of a plurality of fine particle such as the particles 26 shown in FIG. 1b.

Figure 9:
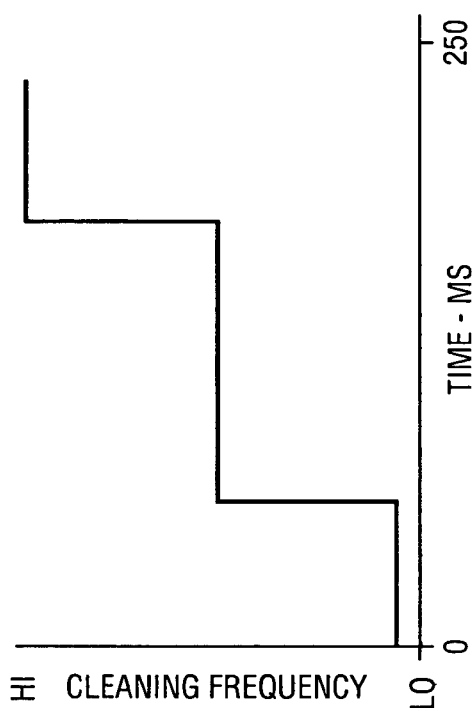
FIG. 9 is a graph depicting a method of the present invention wherein the cleaning frequency of the self-cleaning valve assembly of FIG. 1 is based on a parameter reflecting the time required to stroke the valve.

FIG. 9 shows a cleaning frequency based on a parameter reflecting the time required to stroke the valve 10. An increase in valve friction due to debris reduces efficiency and may increase valve stroke time. Therefore, if the measured valve stroke time exceeds the optimal valve stroke time by a predetermined amount, an increase in valve cleaning frequency may be triggered. In an alternate embodiment, the time required to de-stroke the valve 10 may be compared with the optimal valve de-stroke time to trigger an increase in valve cleaning frequency.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method of cleaning a valve assembly operatively connected within a system for affecting system operation, the method comprising:
   providing a valve assembly comprising a hollow valve body defining a valve bore therein and a valve disposed within said valve bore and normally actuatable in response to a desired system operation;
   producing a triggering signal in response to a predefined condition, and
   actuating said valve by shaking the valve with a high frequency dither based on the natural frequency of said valve in response to said triggering signal to dislodge any debris in the valve assembly irrespective of the normal actuation of said valve for a desired system operation.

2. A method of cleaning a valve assembly operatively connected within a system for affecting system operation, the method comprising:
   providing a valve assembly comprising a hollow valve body defining a valve bore therein and a valve disposed within said valve bore and normally actuatable in response to a desired system operation;
   producing a triggering signal in response to a predefined condition based on a vehicle mileage; and
   actuating said valve in response to said triggering signal to dislodge any debris in the valve assembly irrespective of the normal actuation of said valve for a desired system operation.

3. A method of cleaning a valve assembly operatively connected within a system for affecting system operation, the method comprising:
 providing a valve assembly comprising a hollow valve body defining a valve bore therein and a valve disposed within said valve bore and normally actuatable in response to a desired system operation;
 producing a triggering signal in response to a predefined condition based on a time in range; and
 actuating said valve in response to said triggering signal to dislodge any debris in the valve assembly irrespective of the normal actuation of said valve for a desired system operation.

4. A method of cleaning a valve assembly operatively connected within a system for affecting system operation, the method comprising:
 providing a valve assembly comprising a hollow valve body defining a valve bore therein and a valve disposed within said valve bore and normally actuatable in response to a desired system operation;
 producing a triggering signal in response to a predefined condition based on a shift density parameter; and
 actuating said valve in response to said triggering signal to dislodge any debris in the valve assembly irrespective of the normal actuation of said valve for a desired system operation.

5. A method of cleaning a valve assembly operatively connected within a system for affecting system operation, the method comprising:
 providing a valve assembly comprising a hollow valve body defining a valve bore therein and a valve disposed within said valve bore and normally actuatable in response to a desired system operation;
 producing a triggering signal in response to a predefined condition based on the time required to stroke said valve; and
 actuating said valve in response to said triggering signal to dislodge any debris in the valve assembly irrespective of the normal actuation of said valve for a desired system operation.

6. A self-cleaning valve assembly operatively connected within a system for affecting system operation, the valve assembly comprising:
 a hollow valve body defining a valve bore therein;
 a valve disposed within said valve bore of said valve body and normally actuatable in response to a desired system operation; and
 a programmable controller selectively operable to generate a triggering signal in response to vehicle mileage, said programmable controller further operable to actuate said valve for self-cleaning in response to said triggering signal irrespective of the normal actuation of said valve for a desired system operation.

7. The apparatus of claim 6 wherein said programmable controller is adapted to actuate said valve by completely stroking and de stroking said valve multiple times.

8. The apparatus of claim 6 wherein said programmable controller is adapted to actuate said valve with a high frequency dither having a duration long enough to physically move said valve a slight amount.

9. The apparatus of claim 8 wherein said high frequency dither is based on the natural frequency of said valve.

10. The apparatus of claim 6 wherein said programmable controller is adapted to actuate said valve by partially de-stroking said valve.

11. The apparatus of claim 6 wherein said programmable controller is adapted to actuate said valve by partially stroking said valve.

12. The apparatus of claim 6 wherein said programmable controller is adapted to generate said triggering signal which is further responsive to a time in range.

13. The apparatus of claim 6 wherein said programmable controller is adapted to generate said triggering signal which is further responsive to a shift density parameter.

14. The apparatus of claim 6 wherein said programmable controller is adapted to generate said triggering signal which is further responsive to the time required to stroke said valve.

\* \* \* \* \*